Dec. 19, 1939.     A. W. DOWNES     2,183,642
PROCESS FOR THE POLYMERIZATION OF VINYL ESTERS
Filed Oct. 29, 1937
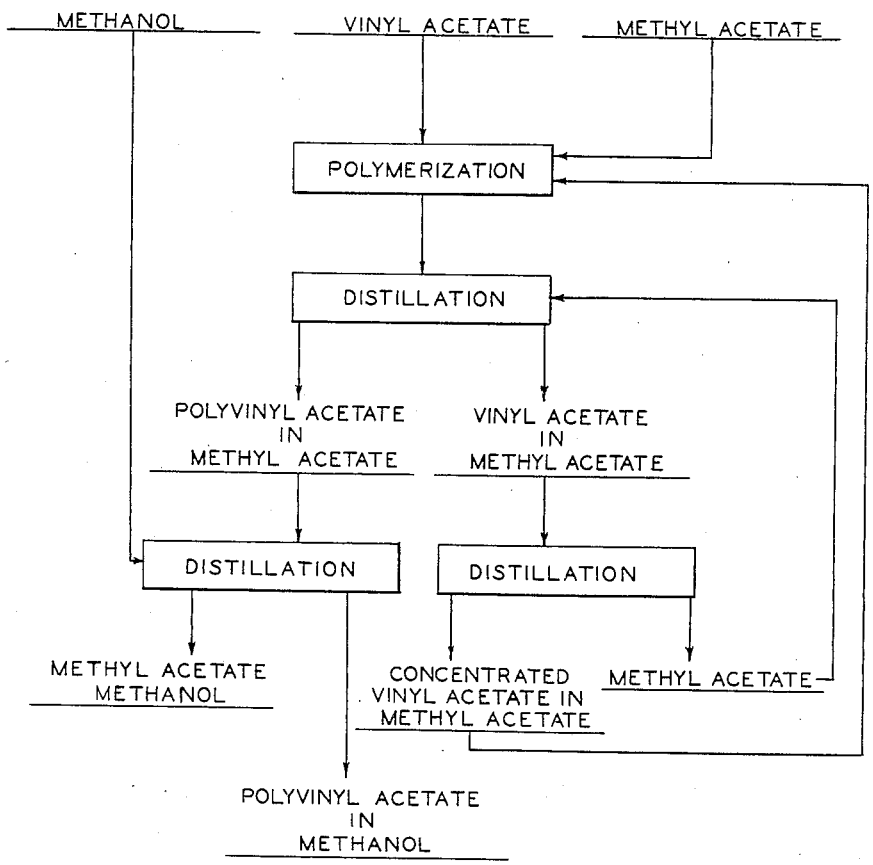
INVENTOR
ALFRED W. DOWNES
BY
*E. Greenewald*
ATTORNEY Patented Dec. 19, 1939

2,183,642

UNITED STATES PATENT OFFICE 2,183,642

PROCESS FOR THE POLYMERIZATION OF VINYL ESTERS

Alfred W. Downes, South Charleston, W. Va., assignor to Carbide and Carbon Chemicals Corporation, a corporation of New York Application October 29, 1937, Serial No. 171,606

12 Claims. (Cl. 260—3.2)

This invention is an improved process for polymerizing vinyl esters, and it particularly relates to the formation of high molecular weight polymers of the vinyl esters of lower aliphatic acids, with a higher conversion rate and greater ease of purification and recovery of the resin than has been heretofore possible.

In the production of vinyl resins, such as the aliphatic polyvinyl esters, and acetals derived therefrom, it is highly desirable to obtain a polymeric aggregate of high average molecular weight and substantially free from unpolymerized material. However, all known methods for polymerizing vinyl esters yield resinous masses which contain polyvinyl molecules of all sizes, ranging from the unreacted monomer to macro-molecules whose molecular weights may be in the tens of thousands or more. Such masses may be purified of the unreacted vinyl esters and the very low polymers by extraction with suitable selective solvents. If the polyvinyl ester is to be converted partially or wholly into polyvinyl alcohol and partially or completely reacted with an aldehyde to form a polyvinyl acetal, the purified polyvinyl ester is dried and redissolved in the proper solvent, hydrolyzed and then acetalized to form the desired partial or complete acetal, as determined by the conditions of reaction. Resins of exceptionally uniform composition may be made in less time and with a saving in labor by conducting the hydrolysis and acetalization of the polyvinyl ester simultaneously in a non-reactive solvent which will maintain all of the materials in solution, and one of the most satisfactory solvents for this purpose is anhydrous methanol.

At best, the purification of the polyvinyl ester aggregate, the complete removal of the selective solvent by drying, and the consequent redissolution of the dried resin in methanol for use in such operations as the preparation of polyvinyl acetals comprise a tedious and costly operation. Methanol can not be used satisfactorily as the solvent in which the polymerization of the vinyl esters is conducted, (thus to remove the necessity for drying the resin) because any heating or distillation of the methanol-vinyl ester mixture must be done with extreme care in order to prevent the conversion of vinyl ester to vinyl alcohol, which immediately isomerizes to acetaldehyde, before polymerization and removal of the lower polymers has taken place.

By the process of this invention, the conversion of the vinyl esters into high molecular weight polymers may be effected in far greater degree than has been possible heretofore while maintaining a high rate of reaction. Moreover, the highly polymerized vinyl ester resin, substantially free from unreacted and slightly polymerized vinyl ester, may be obtained in a methanol solution (or dispersion) directly from the polymerization reaction, thus obviating the necessity for drying the resin and redissolving it in methanol. In addition, where unpolymerized (or slightly polymerized) vinyl ester is present in appreciable quantities in the polymerized product, it may be recovered in a simple and novel manner along with the solvent employed for the polymerization reaction, and returned to the reaction zone with additional vinyl ester to continue the polymerization.

The essence of this process consists in conducting the polymerization of the vinyl ester in methyl acetate, and it is particularly directed to the polymerization of vinyl acetate therein. The use of methyl acetate as the solvent permits a far greater proportion of vinyl acetate to become highly polymerized than is possible in all other solvents whose presence would not complicate further handling and treatment of the resin. Furthermore, when the polymerization has taken place to the desired extent, whatever unreacted vinyl acetate and very low polymers are present are removed from the reaction mixture by a straight distillation with methyl acetate. The additional methyl acetate necessary to effect the removal of the vinyl acetate may be introduced into the mixture either in liquid form or as a vapor. In either case it is desirable to remove the distillation product quickly and with as little rectification as possible. After the vinyl acetate and low polymers have been removed from the highly polymerized mass in solution in the methyl acetate, the methyl acetate may be replaced by methanol through the simple expedient of adding an excess of methanol and removing the methyl acetate by distillation as an azeotropic mixture boiling at 54° C. under atmospheric conditions and containing 18.7% methanol and 81.3% methyl acetate. This distillation also will completely remove any traces of vinyl acetate that might be present, for methanol and vinyl acetate form a low boiling azeotropic mixture which, if desired, can be separated into its components by a water extraction.

Upon displacement of the methyl acetate by methanol, the solution of polyvinyl acetate is ready for conversion to partial polyvinyl acetals, or other resins.

Since methyl acetate has a boiling point below that of vinyl acetate, the solution of unreacted vinyl acetate and lower polymers is concentrated by removing the methyl acetate through fractionation until the residue contains about 50 percent methyl acetate. At this point the remaining methyl acetate and unpolymerized vinyl acetate is quickly distilled from the residue without rectification and returned to the polymerization reaction. This process of concentrating the vinyl acetate prior to another polymerization is much more efficient in the case of methyl acetate than it would be with other solvents. For example, if ethyl acetate were used, the fractional separation of ethyl acetate and vinyl acetate would be much more difficult because of the slight difference in their boiling points.

The accompanying diagram illustrates the flow of materials in the process.

In the following examples, which will serve better to illustrate the process of this invention, the number used to designate the different grades (or degrees of polymerization) of the polyvinyl acetate is derived from the viscosity of a standard molal solution of the resin in benzene, based on the molecular weight of monomeric vinyl acetate. For example, a solution (or dispersion) of one monomeric gram molecular weight (86 grams) of a polyvinyl acetate of grade 25 in sufficient benzene to make one liter will have a viscosity of 25 centipoises at 20° C.

The proportions of the ingredients are parts by weight.

Example 1

A mixture of 50 parts of vinyl acetate and 50 parts of methyl acetate, and 0.038 part of diacetyl peroxide as a catalyst was refluxed at 60° to 65° C. for 12 hours. At the end of this period the mixture had the following composition:

| | Parts |
|---|---|
| Polyvinyl acetate grade 25 | 43.1 |
| Monomeric vinyl acetate (including very low polymers) | 6.8 |
| Methyl acetate | 50.1 |

Eighty percent of the remaining monomeric vinyl acetate (5.4 parts) was removed by adding 109 parts of methyl acetate (or 16 parts of methyl acetate to one part of monomeric vinyl acetate) and distilling without rectification. The composition of the residue, which contained the polyvinyl acetate of grade 25, was as follows:

| | Parts |
|---|---|
| Polyvinyl acetate grade 25 | 45.2 |
| Monomeric vinyl acetate (including very low polymers) | 1.9 |
| Methyl acetate | 52.9 |

The methyl acetate in the residue was replaced by methanol by adding 65.1 parts of methanol (or 1.2 parts of methanol per part of methyl acetate) and distilling the methyl acetate therefrom as the azeotropic mixture boiling at 54° C. under atmospheric pressure and containing 18.7% methanol and 81.3% methyl acetate. The residue, or final methanol solution of polyvinyl acetate, had the following composition:

| | Parts |
|---|---|
| Polyvinyl acetate grade 25 | 45.2 |
| Methanol | 53.2 |
| Methyl acetate | 1.4 |
| Monomeric vinyl acetate (including very low polymers) | 0.2 |

The solution of monomeric vinyl acetate in methyl acetate (obtained from the first distillation) was distilled with rectification to remove methyl acetate until the residue had been concentrated to about 50% vinyl acetate. Thereupon the distillation was continued without rectification for a short time to remove the larger part of the remaining methyl acetate, and the residue was ready for another polymerization reaction. The polymerization of the vinyl acetate during distillation may be prevented by adding 0.02 part of copper acetate to the kettle. Eighty percent of the vinyl acetate was recovered as material suitable to use for further polymerizations.

The material efficiencies of the entire process were as follows:

| | Per cent |
|---|---|
| Vinyl acetate converted to polyvinyl acetate grade 25 | 87.0 |
| Vinyl acetate recovered suitable for further polymerizations | 8.0 |
| Vinyl acetate efficiency | 95.0 |
| Methyl acetate efficiency | 97.0 |

Example 2

A mixture of 85 parts of vinyl acetate, 15 parts of methyl acetate, and 0.03 part of diacetyl peroxide as a catalyst was refluxed at 60° to 65° C. for 70 minutes and processed as in Example 1. Fifty-five percent of the monomeric vinyl acetate was converted to polyvinyl acetate grade 60.

Example 3

A mixture of 75 parts of vinyl acetate, 25 parts of methyl acetate, and 0.03 part of diacetyl peroxide as a catalyst was refluxed at 60° to 65° C. for 70 minutes and processed as in Example 1. Forty-six percent of the monomeric vinyl acetate was converted to polyvinyl acetate grade 43.

Example 4

A mixture of 50 parts of vinyl acetate, 50 parts of methyl acetate, and 0.02 part of diacetyl peroxide as a catalyst was refluxed at 60° to 65° C. for 120 minutes and processed as in Example 1. Thirty-four percent of the monomeric vinyl acetate was converted to polyvinyl acetate grade 27.

Example 5

A mixture of 25 parts of vinyl acetate, 75 parts of methyl acetate, and 0.2 part of diacetyl peroxide as a catalyst was refluxed at 58° to 62° C. for 240 minutes and processed as in Example 1. Seventy-two percent of the monomeric vinyl acetate was converted to polyvinyl acetate grade 7.

Example 6

A mixture of 48 parts of vinyl acetate, 52 parts of methyl acetate, and 0.076 part of dibenzoyl peroxide as a catalyst was refluxed at 58° to 62° C. for 195 minutes and processed as in Example 1. Fifty-three percent of the monomeric vinyl acetate was converted to polyvinyl acetate grade 27.

Example 7

A mixture of 48 parts of vinyl acetate, 52 parts of methyl acetate, and 0.038 part of diacetyl peroxide as a catalyst was refluxed at 58° to 62° C. for 195 minutes and processed as in Example 1. Eighty-four percent of the monomeric vinyl acetate was converted to polyvinyl acetate grade 25.

The polymerization of vinyl acetate dissolved in methyl acetate to obtain a particular grade of polyvinyl acetate may be simplified by thoroughly purifying the vinyl acetate and methyl acetate prior to the polymerization, for the presence of aldehydes has a detrimental effect upon the grade of polymer obtained. If both the vinyl acetate and methyl acetate are separately distilled with rectification and the first 10% of each distillate discarded, the remainder of the distillate is a very pure material (containing approximately 0.02% aldehyde calculated as acetaldehyde). The use of such purified material permits the use of a lower charging ratio of vinyl acetate to methyl acetate to obtain the desired grade of polyvinyl acetate than is possible with unpurified material, and this lower charging ratio results in practically complete conversion of the monomer to polymer when a polyvinyl acetate of grade 25 or less is desired. This high conversion (97% to 99%) usually eliminates the necessity for removing unpolymerized material by distillation with additional methyl acetate, and the latter may be replaced directly with methanol, with substantially all of the unpolymerized material being removed during the distillation along with the methyl acetate and methanol azeotropic mixture.

The following examples will serve to illustrate this embodiment of the invention:

*Example 8*

A mixture of 40 parts of vinyl acetate (acetaldehyde content 0.028%) and 60 parts of methyl acetate (acetaldehyde content 0.02%), and 0.03 part of diacetyl peroxide as a catalyst, was refluxed at 60° to 65° C. for 10 hours. At the end of this period, excess methanol was added and the methyl acetate and traces of unreacted material removed by distillation. Ninety-nine percent of the monemeric vinyl acetate was converted to polyvinyl acetate grade 25.

*Example 9*

A mixture of 40 parts of vinyl acetate (acetaldehyde content 0.02%) and 60 parts of methyl acetate (acetaldehyde content 0.02%), and 0.03 part of diacetyl peroxide as a catalyst was refluxed at 60° to 65° C. for 15 hours and processed as in Example 8. Ninety-eight percent of the monomeric vinyl acetate was converted to polyvinyl acetate grade 26.

Although the process of this invention is directed particularly to the polymerization of vinyl acetate, other lower aliphatic vinyl esters, such as vinyl propionate or butyrate, may be used with very satisfactory results. In general, vinyl esters which are soluble in methyl acetate, both in the monomeric and polymeric form, and when in the monomeric form have boiling points above that of methyl acetate may be polymerized successfully by the process of this invention, which should not be limited other than as defined in the appended claims.

I claim:

1. Process for producing a highly polymerized vinyl resin which comprises polymerizing a single vinyl ester of a lower saturated aliphatic acid when dissolved in methyl acetate, the presence of the methyl acetate permitting a high proportion of the vinyl ester to become highly polymerized.

2. Process for producing a highly polymerized vinyl resin which comprises polymerizing a single vinyl ester of a lower saturated aliphatic acid when dissolved in methyl acetate, the presence of the methyl acetate permitting a high proportion of the vinyl ester to become highly polymerized, and removing unpolymerized vinyl ester from the polymeric aggregate by distillation with methyl acetate.

3. Process for preparing a solution in methanol of highly polymerized vinyl esters of lower aliphatic acids, which comprises polymerizing the vinyl ester in methyl acetate and thereafter displacing the methyl acetate with methanol by adding excess methanol to the polyvinyl ester solution and distilling the methyl acetate therefrom.

4. Process for preparing a methanol solution of polymerized vinyl esters of lower aliphatic acids which comprises polymerizing the vinyl ester in methyl acetate, removing unreacted material from the polymeric aggregate by distillation with methyl acetate and then displacing the methyl acetate with methanol by adding excess methanol to the polyvinyl ester solution and distilling the methyl acetate therefrom together with methanol.

5. In the process of producing partial polyvinyl acetal resins, the step of obtaining the polymerized vinyl ester in a methanol solution which comprises polymerizing the vinyl ester in methyl acetate, removing unreacted material from the polymeric aggregate by distillation with methyl acetate and then displacing the methyl acetate with methanol by adding excess methanol to the polyvinyl ester solution and distilling the methyl acetate therefrom together with methanol.

6. Process for producing a highly polymerized vinyl resin which comprises polymerizing vinyl acetate when dissolved as the sole polymerizable compound in methyl acetate, the presence of the methyl acetate permitting a high proportion of the vinyl ester to become highly polymerized.

7. Process for preparing a solution in methanol of highly polymerized vinyl acetate, which comprises polymerizing the vinyl acetate in methyl acetate and thereafter displacing the methyl acetate with methanol by adding excess methanol to the polyvinyl acetate solution and distilling the methyl acetate therefrom.

8. Process for producing a methanol solution of polymerized vinyl acetate substantially free from unpolymerized material, which comprises polymerizing the vinyl acetate in methyl acetate; removing unreacted and slightly polymerized material from the polymeric aggregate by distillation with methyl acetate; and then displacing the methyl acetate with methanol by adding excess methanol to the polyvinyl acetate solution and distilling the methyl acetate therefrom together with methanol.

9. In the process of producing partial polyvinyl acetal resins, the step of obtaining the polymerized vinyl acetate in a methanol solution which comprises polymerizing the vinyl acetate in methyl acetate; removing unreacted material from the polymeric aggregate by distillation with methyl acetate; and then displacing the methyl acetate with methanol by adding excess methanol to the polyvinyl acetate solution and distilling the methyl acetate therefrom together with methanol.

10. The process of producing highly polymerized vinyl resins substantially free of unpolymerized material, which comprises polymerizing vinyl acetate in methyl acetate until conversion of the vinyl acetate to high molecular weight polymers is substantially complete, and then displacing both the methyl acetate and the traces of unpolymerized vinyl acetate with methanol by distillation in the presence of an excess of methanol.

11. The process of producing highly polymerized vinyl resins substantially free of unpolymerized vinyl compounds with both a high material conversion and high rate of reaction, which comprises polymerizing vinyl acetate in methyl acetate; removing unpolymerized and slightly polymerized vinyl acetate from the polymeric aggregate by distillation in admixture with methyl acetate; concentrating the vinyl acetate in the distillate by removing methyl acetate by fractionation, and returning the concentrated vinyl acetate to the polymerization reaction; adding an excess of methanol to said polymeric aggregate and removing the methyl acetate therefrom by distillation.

12. In the process of producing highly polymerized partial polyvinyl acetal resins substantially free of unpolymerized and slightly polymerized vinyl compounds, the step of polymerizing vinyl acetate with both a high material conversion and high rate of reaction which comprises polymerizing vinyl acetate in methyl acetate; removing unpolymerized and slightly polymerized vinyl acetate from the polymeric aggregate by distillation in admixture with methyl acetate; concentrating the vinyl acetate in the distillate by removing methyl acetate by fractionation, and returning the concentrated vinyl acetate to the polymerization reaction; adding an excess of methanol to said polymeric aggregate and removing the methyl acetate therefrom by distillation.

ALFRED W. DOWNES.